US012040110B2

(12) United States Patent
Ko et al.

(10) Patent No.: US 12,040,110 B2
(45) **Date of Patent: *Jul. 16, 2024**

(54) GRAIN-ORIENTED ELECTRICAL STEEL SHEET AND MANUFACTURING METHOD THEREFOR

(71) Applicant: POSCO CO., LTD, Pohang-si (KR)

(72) Inventors: Hyun-Seok Ko, Pohang-si (KR); Kyu-Seok Han, Pohang-si (KR); Hyung-Ki Park, Pohang-si (KR); Jin-Wook Seo, Pohang-si (KR); Jae-Soo Lim, Pohang-si (KR); Hyung Don Joo, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 352 days.

This patent is subject to a terminal disclaimer.

(21) Appl. No.: 17/318,407

(22) Filed: May 12, 2021

(65) Prior Publication Data

US 2021/0265087 A1 Aug. 26, 2021

Related U.S. Application Data

(62) Division of application No. 15/529,870, filed as application No. PCT/KR2014/012010 on Dec. 8, 2014, now Pat. No. 11,031,162.

(30) Foreign Application Priority Data

Nov. 27, 2014 (KR) ........................ 10-2014-0167763

(51) Int. Cl.

| | |
|---|---|
| ***C21D 9/46*** | (2006.01) |
| ***C21D 3/04*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***H01F 1/147*** | (2006.01) |

(52) U.S. Cl.

CPC ........... *H01F 1/14775* (2013.01); *C21D 3/04* (2013.01); *C21D 8/12* (2013.01); *C21D 8/1222* (2013.01); *C21D 8/1233* (2013.01); *C21D 8/1255* (2013.01); *C21D 8/1261* (2013.01); *C21D 8/1266* (2013.01); *C21D 8/1272* (2013.01); *C21D 9/46* (2013.01); *C22C 38/002* (2013.01); *C22C 38/004* (2013.01); *C22C 38/02* (2013.01); *C22C 38/04* (2013.01)

(58) Field of Classification Search

CPC .. C21D 3/04; C21D 6/008; C21D 8/12–1272; C22C 38/02; C22C 38/34; H01F 1/14766–14791

See application file for complete search history.

(56) References Cited

U.S. PATENT DOCUMENTS

| | | | | |
|---|---|---|---|---|
| 4,595,426 | A | 6/1986 | Iwayama | |
| 4,851,056 | A | 7/1989 | Miyoshi | |
| 5,143,561 | A | 9/1992 | Kitamura et al. | |
| 5,306,353 | A | 4/1994 | Hayakawa et al. | |
| 5,653,821 | A * | 8/1997 | Choi | H04N 19/107 148/113 |
| 6,488,784 | B1 * | 12/2002 | Fortunati | C21D 8/1255 148/111 |
| 2001/0042576 | A1 * | 11/2001 | Yoshitomi | H01F 1/14775 148/648 |
| 2003/0034092 | A1 * | 2/2003 | Takashima | C21D 8/1272 148/307 |
| 2004/0123879 | A1 | 7/2004 | Yim et al. | |
| 2006/0177596 | A1 | 8/2006 | De Meyer et al. | |
| 2012/0000262 | A1 * | 1/2012 | Li | C21D 9/46 72/200 |
| 2012/0129001 | A1 | 5/2012 | Schuhmacher et al. | |
| 2013/0174940 | A1 | 7/2013 | Cicale | |
| 2013/0180634 | A1 * | 7/2013 | Han | C22C 38/06 148/645 |
| 2014/0205857 | A1 | 7/2014 | Goto et al. | |
| 2015/0294774 | A1 | 10/2015 | Zirlin | |

(Continued)

FOREIGN PATENT DOCUMENTS

| | | | |
|---|---|---|---|
| CN | 1073216 | A | 6/1993 |
| CN | 1073728 | A | 6/1993 |

(Continued)

OTHER PUBLICATIONS

Cornell et al, "Decarburization of Steel," 2017. University of Cambridge. (Year: 2017).*

International Written Opinion and Search Report dated Jul. 24, 2015 issued in International Patent Application No. PCT/KR2014/012010 (with English translation).

Notice of Allowance dated Feb. 9, 2021 issued in U.S. Appl. No. 15/529,870.

Non-Final Office Action dated Aug. 4, 2020 issued in U.S. Appl. No. 15/529,870.

(Continued)

*Primary Examiner* — Alexandra M Moore

(74) *Attorney, Agent, or Firm* — Morgan, Lewis & Bockius LLP

(57) ABSTRACT

Disclosed are an oriented electrical steel sheet and a manufacturing method thereof. An exemplary embodiment of the present invention provides a method of manufacturing an oriented electrical steel sheet, including: providing a slab including Si at 1.0 to 4.0 wt %, C at 0.1 to 0.4 wt %, and the remaining portion including Fe and other inevitably incorporated impurities; reheating the slab; producing a hot rolled steel sheet by hot rolling the slab; performing annealing of the hot rolled steel sheet; cold rolling the annealed hot rolled steel sheet; decarburizing and primary annealing the cold rolled steel sheet; cold rolling the decarburized and annealed steel sheet; and secondary annealing the cold rolled steel sheet.

11 Claims, 14 Drawing Sheets

(56) References Cited

U.S. PATENT DOCUMENTS

| | | | | |
|---|---|---|---|---|
| 2022/0106657 | A1* | 4/2022 | Han | C22C 38/04 |
| 2022/0389532 | A1* | 12/2022 | Ko | C21D 8/1222 |

FOREIGN PATENT DOCUMENTS

| | | | |
|---|---|---|---|
| CN | 1078270 | A | 11/1993 |
| CN | 1481446 | A | 3/2004 |
| CN | 1692164 | A | 11/2005 |
| CN | 1692165 | A | 11/2005 |
| CN | 101528950 | A | 9/2009 |
| CN | 101545072 | A | 9/2009 |
| CN | 101603148 | A | 12/2009 |
| CN | 101728253 | A | 6/2010 |
| CN | 101748257 | A | 6/2010 |
| CN | 101768697 | A | 7/2010 |
| CN | 101952462 | A | 1/2011 |
| CN | 102041449 | A | 5/2011 |
| CN | 102102142 | A | 6/2011 |
| CN | 103429775 | A | 12/2013 |
| CN | 103534366 | A | 1/2014 |
| CN | 103805918 | A | 5/2014 |
| CN | 104726667 | A | 6/2015 |
| EP | 0709470 | A1 | 5/1996 |
| EP | 0716151 | A1 | 6/1996 |
| EP | 2272995 | A1 | 1/2011 |
| JP | S62-140401 | A | 6/1987 |
| JP | H08-276929 | A | 10/1996 |
| JP | H09-143560 | A | 6/1997 |
| JP | H09-268422 | A | 10/1997 |
| JP | H10-317060 | A | 12/1998 |
| JP | H11-51269 | A | 2/1999 |
| JP | 2002-212638 | A | 7/2002 |
| JP | 2008-513595 | A | 5/2008 |
| JP | 2010-156006 | A | 7/2010 |
| JP | 2010-229483 | A | 10/2010 |
| JP | 2011-517732 | A | 6/2011 |
| JP | 2011-208188 | A | 10/2011 |
| JP | 2012-528247 | A | 11/2012 |
| KR | 10-2003-0013258 | A | 2/2003 |
| KR | 10-2008-0042860 | A | 5/2008 |
| KR | 10-2011-0036390 | A | 4/2011 |
| KR | 10-2013-0019456 | A | 2/2013 |
| KR | 10-2015-0074914 | A | 7/2015 |
| WO | 2009/091127 | A2 | 7/2009 |
| WO | 2011/115120 | A1 | 9/2011 |
| WO | 2013/008341 | A1 | 1/2013 |

OTHER PUBLICATIONS

Japanese Office Action dated Aug. 6, 2019, issued in Japanese Patent Application No. 2017-545837, with English translation.

European Search Report dated Nov. 7, 2017, issued in European Patent Appliation No. 14906696.1.

* cited by examiner

- Prior Art -

- Prior Art -

GRAIN-ORIENTED ELECTRICAL STEEL SHEET AND MANUFACTURING METHOD THEREFOR

CROSS-REFERENCE OF RELATED APPLICATIONS

This application is a divisional of U.S. patent application Ser. No. 15/529,870, filed on May 25, 2017, which is a U.S. National Phase under 35 U.S.C. § 371 of International Patent Application No. PCT/KR2014/012010, filed on Dec. 8, 2014, which in turns claims the benefit of Korean Application No. 10-2014-0167763, filed on Nov. 27, 2014, the entire disclosures of which applications are incorporated by reference herein.

TECHNICAL FIELD

The present invention relates to an oriented electrical steel sheet and a manufacturing method thereof.

BACKGROUND ART

An oriented electrical steel sheet includes grains having an orientation of {110}<001> as the so-called Goss orientation, and it is a soft magnetic material with excellent magnetic characteristics in a rolling direction.

The oriented electrical steel sheet is rolled to a final thickness of about 0.15 to 0.35 mm through slab heating, hot rolling, hot rolled sheet annealing, and cold rolling, and then high temperature annealing is performed for first recrystallization and second recrystallization.

In this case, it is known that, in the high temperature annealing, as an increase rate of temperature is low, a degree of integration of the Goss orientation of the second recrystallization is high, thus the oriented electrical steel sheet has excellent magnetic properties. In the high temperature annealing of a typical oriented electrical steel sheet, since the temperature increase rate is about 15° C. or less per hour, it takes about 2 to 3 days to raise the temperature, and more than about 40 hours is necessary for purification annealing, thus the high temperature annealing may become a process which consumes an enormous amount energy. In addition, in a current final high temperature annealing process, since a batch of a coil state is annealed, the following difficulties may occur. First, since a temperature difference between an outer winding portion and an inner winding portion of the coil occurs due to heat treatment in the coil state, the same heat treatment pattern may not be applied to each winding portion, resulting in magnetic deviation between the outer winding portion and the inner winding portion. Second, after decarburization annealing, MgO is coated on a surface of the coil, and then while base coating is performed in the high temperature annealing, various surface defects are generated, thus an actual production yield may be reduced. Third, since the decarburized annealed sheet is wound in a form of a coil, annealed at high temperature, and then processed by planarization annealing and insulation-coated, that is, since a production process is divided into three stages, an actual production yield may be reduced.

DISCLOSURE

Technical Problem

The present invention has been made in an effort to provide an oriented electrical steel sheet and a manufacturing method thereof.

Technical Solution

An exemplary embodiment of the present invention provides a method of manufacturing an oriented electrical steel sheet, including: providing a slab including Si at 1.0 to 4.0 wt %, C at 0.1 to 0.4 wt %, and the remaining portion including Fe and other inevitably incorporated impurities; heating the slab; producing a hot rolled steel sheet by hot rolling the slab; performing annealing of the hot rolled steel sheet; cold rolling the annealed hot rolled steel sheet; decarburizing and primary annealing the cold rolled steel sheet; cold rolling the decarburized and annealed steel sheet; and secondary annealing the cold rolled steel sheet.

The secondary annealing may be continuously performed after the cold rolling.

The decarburizing and primary annealing of the cold rolled steel sheet and the cold rolling of the decarburized and annealed steel sheet may be repeated two or more times.

A size of a grain of a surface of the decarburized and annealed steel sheet may be in a range of about 150 μm to about 250 μm.

The decarburizing and primary annealing may be performed in a region where a single phase of austenite or a composite phase of ferrite and austenite exists.

The decarburizing and primary annealing may be performed at an annealing temperature of about 850° C. to about 1000° C. and at a dew point temperature of about 50° C. to about 70° C.

When the decarburizing and primary annealing is performed, a decarburized amount may be in a range of about 0.0300 wt % to about 0.0600 wt %.

When the cold rolling is performed, a reduction ratio may be in a range of about 50% to about 70%.

The secondary annealing may include a first step that is performed at an annealing temperature of about 850° C. to about 1000° C. and a dew point temperature of about 70° C. or less, and a second step that is performed at an annealing temperature of about 1000° C. to about 1200° C. and in an atmosphere of about 50 volume % of $H_2$.

A carbon amount of the electrical steel sheet after the secondary annealing step may be about 0.002 wt % or less.

The first step may be performed for 300 seconds or less, and the second step may be performed for about 60 to 300 seconds.

A reheating temperature of the slab may be in a range of about 1100° C. to about 1350° C.

The slab may include Mn at more than about 0% and about 0.1% or less, and S at more than about 0 wt % and about 0.005 wt % or less.

Another embodiment of the present invention provides an oriented electrical steel sheet, including Goss grains in which a ratio (D2/D1) of a diameter (D1) of a circumscribed circle thereof to a diameter (D2) of an inscribed circle thereof is greater than about 0.5 is about 95% or more of total Goss grains.

Grains of the oriented electrical steel sheet having a grain size of about 30 μm to about 1000 μm is about 80% or more of total grains.

The oriented electrical steel sheet may include Mn at more than about 0% and about 0.1% or less, S at more than about 0 wt % and about 0.005 wt % or less, and the remaining portion including Fe and other inevitably impurities.

The oriented electrical steel sheet may include Si at about 1.0 wt % to about 4.0 wt % and C at about 0.002 wt % or less (excluding 0 wt %).

A content of Mg at a depth of about 2 μm to about 5 μm from a surface of the electrical steel sheet may be about 0.0050 wt % or less.

Advantageous Effects

According to the method of manufacturing the oriented electrical steel sheet of the embodiment of the present invention, it is possible to perform continuous annealing without performing batch-type annealing in a coil state during secondary annealing.

In addition, it is possible to produce an oriented electrical steel sheet through a short time of annealing.

Further, unlike a conventional method of manufacturing an oriented electrical steel sheet, a step of winding a cold rolled steel sheet is unnecessary.

According to the method of manufacturing the oriented electrical steel sheet of the embodiment of the present invention, it is also possible to provide an oriented electrical steel sheet which does not use a grain growth inhibitor.

In addition, a nitriding annealing process may be omitted.

DESCRIPTION OF THE DRAWINGS

FIG. 4A to FIG. 41 are photographs showing change of a Goss fraction in a texture of an oriented electrical steel sheet during a secondary annealing process in a method of manufacturing an oriented electrical steel sheet according to an embodiment of the present invention through EBSD analysis.

MODE FOR INVENTION

Figure 1A:
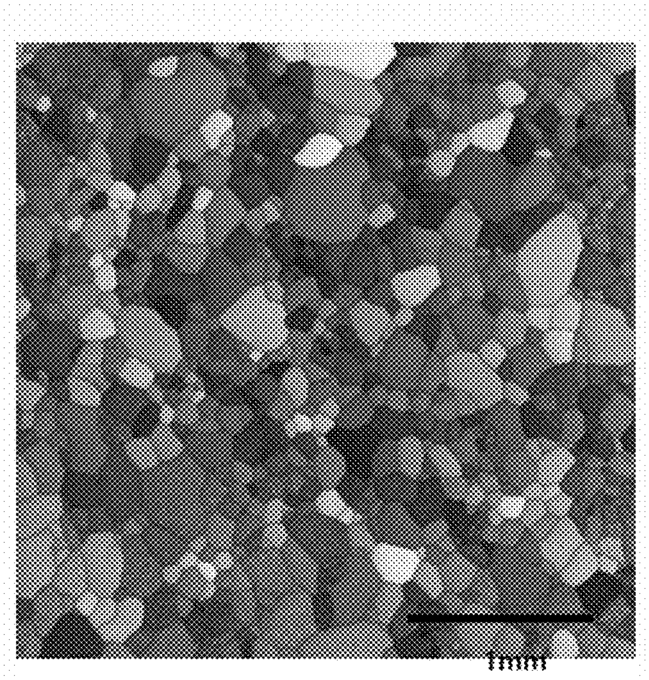
FIG. 1A is a photograph showing Goss grain distribution of an oriented electrical steel sheet according to an embodiment of the present invention through EBSD analysis. Portions indicated by gray or black other than portions indicated by white indicate Goss grains.

The advantages and features of the present invention and the methods for accomplishing the same will be apparent from the exemplary embodiments described hereinafter with reference to the accompanying drawings. However, the present invention is not limited to the exemplary embodiments described hereinafter, but may be embodied in many different forms. The following exemplary embodiments are provided to make the disclosure of the present invention complete and to allow those skilled in the art to clearly understand the scope of the present invention, and the present invention is defined only by the scope of the appended claims. Throughout the specification, the same reference numerals denote the same constituent elements.

In some exemplary embodiments, detailed description of well-known technologies will be omitted to prevent the disclosure of the present invention from being ambiguously interpreted. Unless otherwise defined, all terms (including technical and scientific terms) used herein have the same meaning as commonly understood by one of ordinary skill in the art. In addition, throughout the specification, unless explicitly described to the contrary, the word "comprise" and variations such as "comprises" or "comprising" will be understood to imply the inclusion of stated elements but not the exclusion of any other elements. Further, as used herein, the singular forms "a", "an", and "the" are intended to include the plural forms as well, unless the context clearly indicates otherwise.

A method of manufacturing an oriented electrical steel sheet according to an exemplary embodiment of the present invention first provides a slab including Si at 1.0 to 4.0 wt %, C at 0.1 to 0.4 wt %, and the remaining portion including Fe and other inevitably incorporated impurities. In addition, the slab may further include more than 0 wt % and 0.1 wt % or less of Mn, and more than 0 wt % and 0.005 wt % or less of S.

The reason for limiting the composition is as follows.

Si reduces iron loss by lowering magnetic anisotropy of the electrical steel sheet and increasing specific resistance thereof. When a content of Si is less than 1.0%, the iron loss reduces, and when the content of Si is more than 4.0%, brittleness increases. Accordingly, a content of Si in the slab and a content of Si in the grain oriented electrical steel sheet after a secondary annealing process may be about 1.0% to about 4.0%.

Since a process in which C of a central portion escapes from a surface is required so that Goss grains in the surface may be diffused to the center portion during an intermediate decarburization annealing process and a final decarburization annealing process, the content of C in the slab may be about 0.1 to 0.4%. In addition, after the secondary annealing process in which decarburization is completed, an amount of carbon in the oriented electrical steel sheet may be about 0.0020 wt % or less.

Since Mn and S form MnS precipitates, they interfere with growth of Goss grains diffusing to the center portion during the decarburization process. Accordingly, it is preferable that Mn and S are not added. However, considering an amount inevitably added during a steelmaking process, it is preferable to adjust Mn and S in the slab and the oriented electrical steel sheet after the secondary annealing process to more than 0% and 0.1% or less of Mn, and more than 0% and 0.005% or less of S, respectively.

The steel slab having the above composition is reheated. The slab reheating temperature may be about 1100° C. to about 1350° C. higher than a typical reheating temperature.

When the slab reheating temperature is high, there is a problem that a hot rolled structure is coarsened and magnetism thereof is adversely affected. However, in the method of manufacturing the oriented electrical steel sheet according to the exemplary embodiment of the present invention, since the content of carbon is more than that of the prior art, even though the slab reheating temperature is high, the hot rolled structure is not coarsened, and it is advantageous in hot rolling by reheating at a higher temperature than usual.

A hot rolled steel sheet is manufactured by hot-rolling the slab after reheating.

The hot rolled steel sheet is then annealed. In this case, an annealing temperature for the hot rolled sheet may be about 850° C. to about 1000° C. In addition, a dew point temperature may be 50° C. to about 70° C.

After the decarburization annealing of the hot rolled sheet, an acid pickling process is performed, and then a cold rolling process is performed to produce a cold rolled steel sheet. The cold rolled steel sheet is decarburized and annealed. In addition, the steel sheet on which the decarburization annealing has been completed is cold rolled.

The decarburization annealing of the cold rolled steel sheet and the cold-rolling of the steel sheet after the decarburization annealing may be repeated two or more times.

In the method of manufacturing the oriented electrical steel sheet according to the exemplary embodiment of the present invention, a description of the decarburization annealing process will now be provided.

The decarburization annealing process may be performed at a dew point temperature of about 50° C. to about 70° C. in a region where a single phase of austenite or a composite phase of ferrite and austenite exists. In this case, the annealing temperature may be in a range of about 850° C. to about 1000° C. In addition, an atmosphere for the annealing process may be a mixed gas atmosphere of hydrogen and nitrogen. Moreover, while the decarburization annealing process is performed, a decarburization amount may be about 0.0300 wt % to about 0.0600 wt %.

Figure 3:
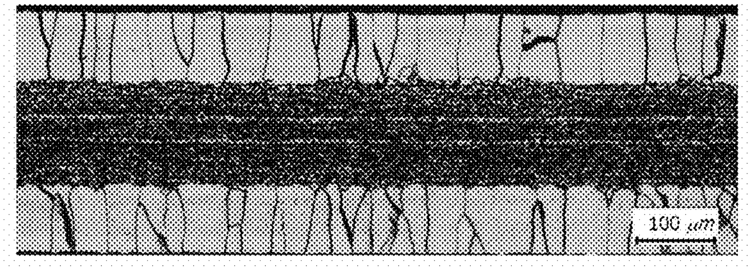
FIG. 3 is a photograph showing change in a microstructure observed during a decarburization annealing process in a method of manufacturing an oriented electrical steel sheet according to an embodiment of the present invention.
Figure 4A:
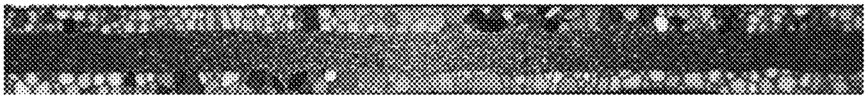
Figure 4B:
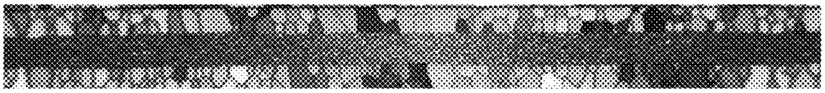
Figure 4C:
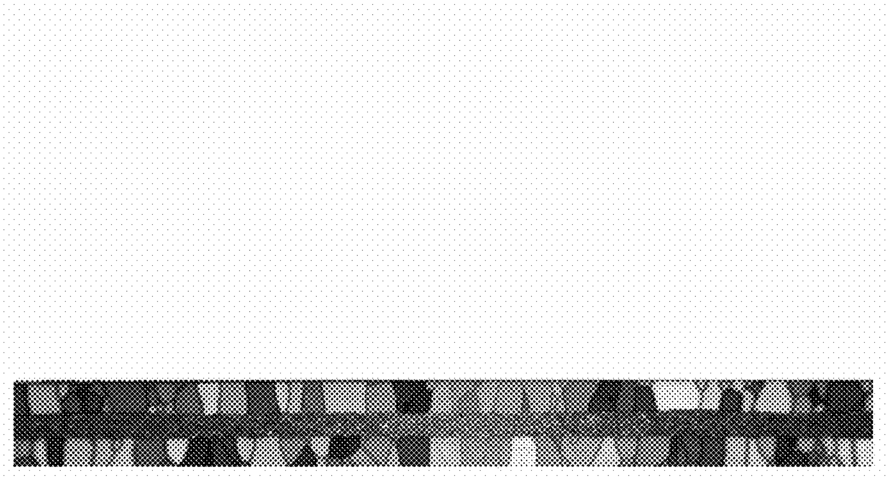
Figure 4D:
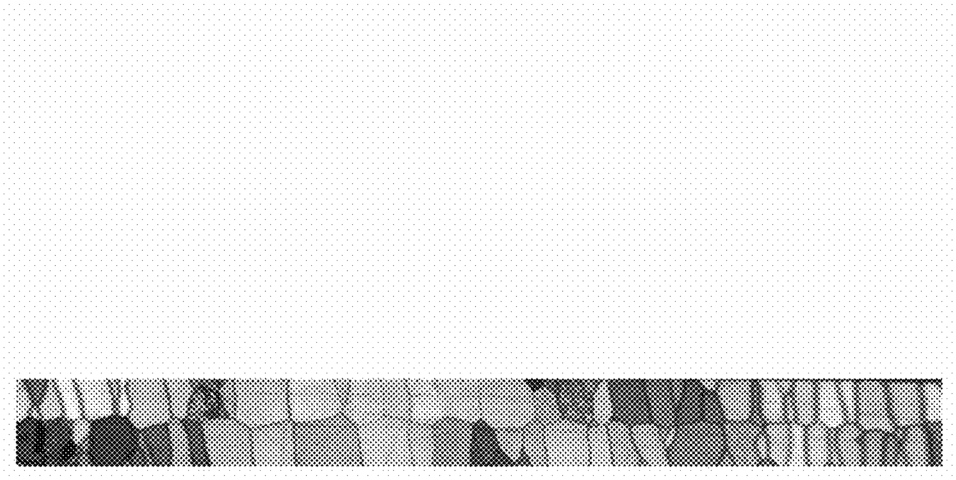
Figure 4E:
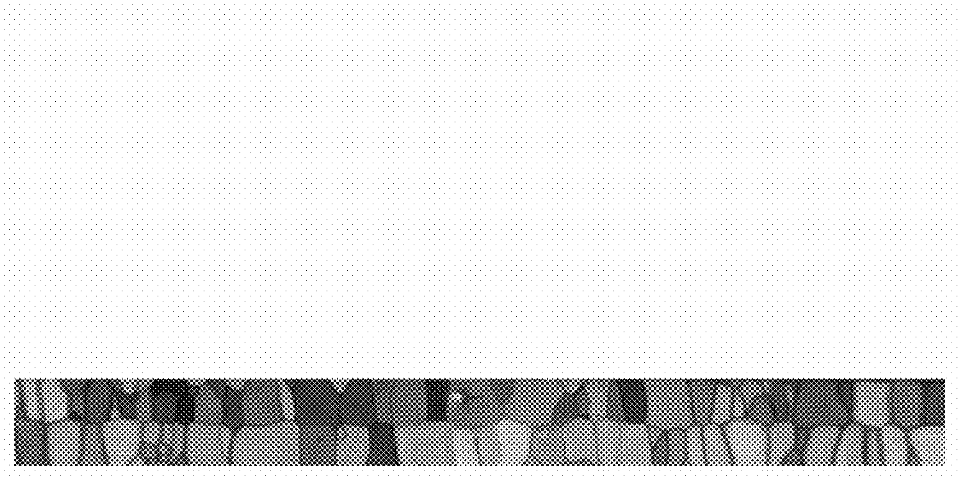
Figure 4F:
Figure 4G:
Figure 4H:
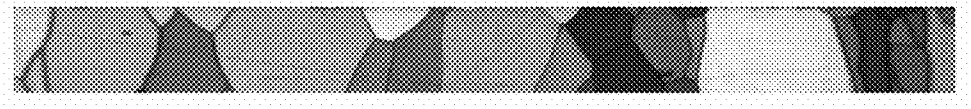
Figure 4I:
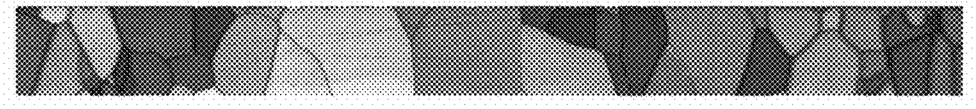

In the decarburization annealing process, as shown in FIG. 3, grains of a surface of the electric steel sheet may coarsely grow, but grains inside the electric steel sheet remain in a microstructure state. After the decarburization annealing process, sizes of the surficial ferrite grains may be about 150 μm to about 250 μm.

In the method of manufacturing the oriented electrical steel sheet according to the exemplary embodiment of the present invention, a cold rolling process will now be described.

It is known that it is effective to perform cold rolling one time at a high reduction ratio close to about 90% in a manufacturing process of a conventional high magnetic flux density oriented electric steel sheet. This is because only Goss crystal grains of primary recrystallized grains create an environment favorable for grain growth.

However, since the method of manufacturing the oriented electrical steel sheet according to the exemplary embodiment of the present invention internally diffuses the Goss grains in the surface caused by decarburization annealing and cold rolling without using abnormal grain growth of the Goss oriented grains, it is advantageous to form a plurality of Goss oriented grains in the surface.

Therefore, when the cold rolling is performed at a reduction ratio of about 50% to about 70% during the cold rolling, a plurality of Goss textures may be formed in the surficial portion. Alternatively, when the cold rolling is performed at a reduction ratio of about 55% to about 65% during the cold rolling, a plurality of Goss textures may be formed in the surficial portion.

In addition, when the decarburization annealing and the cold rolling are performed two or more times, a plurality of Goss textures may be formed in the surficial portion.

After the decarburization annealing and the cold rolling are completed, the electrical steel sheet is finally annealed.

Unlike a conventional batch method, the method of manufacturing the oriented electrical steel sheet according to the exemplary embodiment of the present invention may continuously perform the secondary annealing after the cold rolling.

In the method of manufacturing the oriented electrical steel sheet according to the exemplary embodiment of the present invention, the secondary annealing process may be divided into a first step of performing annealing at an annealing temperature of about 850° C. to about 1050° C. and a dew point temperature of about 50° C. to about 70° C., and a second step of annealing at an annealing temperature of about 1000° C. to about 1200° C. and an atmosphere of about 50 volume % of $H_2$. In addition, the atmosphere of the second step may be 90 volume % or more of $H_2$.

FIG. 4 is a photograph showing change of texture through EBSD analysis of the oriented electric steel sheet during the secondary annealing process in the method of manufacturing the oriented electrical steel sheet according to the exemplary embodiment. In FIG. 4, portions indicated by gray or black other than portions indicated by white indicate Goss oriented texture, and the change of the texture is progressed in order from FIG. 4A to FIG. 41.

Before the secondary annealing, since the decarburization annealing proceeds, an amount of carbon of about 40 wt % to about 60 wt % compared to a minimum amount of carbon of the slab may remain in the cold rolled sheet. Accordingly, in the first step of the secondary annealing, while the carbon escapes from the surface, the grains formed in the surface are diffused to the inside. In the first step, the steel sheet may be decarburized such that the carbon amount thereof may be about 0.01 wt % or less.

Then, in the second step, the Goss oriented texture diffused in the first step grows. Unlike a case in which grains are grown by a conventional abnormal grain growth, a size of the grains of the texture may be about 1 mm or less in the method of manufacturing the oriented electrical steel sheet according to the exemplary embodiment of the present invention. Accordingly, it is possible to form a texture in which a plurality of Goss grains having a smaller size than that of a conventional oriented electrical steel sheet exist.

The oriented electrical steel sheet on which the secondary annealing is completed may be dried after applying an insulating coating liquid thereon, as necessary.

In the prior art, a MgO coating layer exists because an annealing separator including MgO as a main component is coated in a batch form during the secondary annealing, but since the secondary annealing is performed in a continuous form, not in a batch form, no MgO coating layer may exist in the oriented electrical steel sheet according to the embodiment of the present invention.

Accordingly, in the oriented electrical steel sheet according to the exemplary embodiment of the present invention, a Mg content at a depth of about 2 μm to about 5 μm from the surface of the steel sheet may be about 0.0050 wt % or less. This is because only Mg of the insulating coating layer diffuses and penetrates into the texture of the oriented electrical steel sheet.

According to the method of manufacturing the oriented electrical steel sheet according to the exemplary embodiment of the present invention, the following oriented electrical steel sheet may be provided.

FIG. 1A is a photograph showing grain distribution of an oriented electrical steel sheet according to an embodiment of the present invention through EBSD analysis. In addition, FIG. 1B is a photograph indicating a circumscribed circle and an inscribed circle on each grain of the oriented electrical steel sheet shown in FIG. 1A.

Referring to FIG. 1, in the oriented electrical steel sheet according to the exemplary embodiment of the present invention, grains of which a ratio (D2/D1) of a diameter (D1) of a circumscribed circle of each grain to a diameter (D2) of scribed circle of each grain is greater than 0.5 may be 95% or more of total grains.

Herein, the circumscribed circle means a smallest circle among virtual circles surrounding the outsides of the grains, and the inscribed circle means a largest circle of virtual circles inside the grains.

Figure 1B:
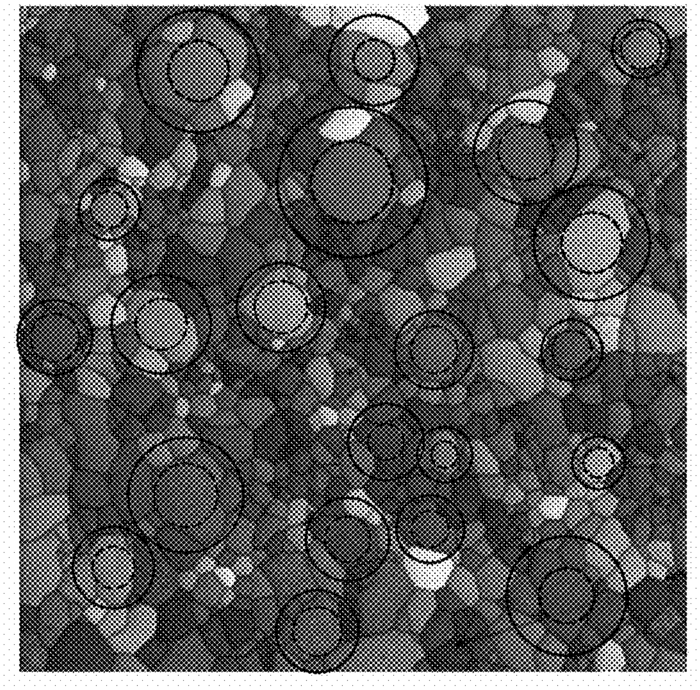
FIG. 1B is a photograph indicating a circumscribed circle and an inscribed circle on each grain of the oriented electrical steel sheet shown in FIG. 1A.

Table 1 shows the ratio (D2/D1) of the relative sizes of the inscribed circles and the circumscribed circles of the grains of the oriented electrical steel sheet according to the embodiment of the present invention shown in FIG. 1B.

TABLE 1

| Circumscribed circle D1 | Inscribed circle D2 | Ratio (D2/D1) |
|---|---|---|
| 2.4 | 1.6 | 0.67 |
| 2.6 | 1.5 | 0.58 |
| 2.8 | 2 | 0.71 |
| 1.7 | 1.1 | 0.65 |
| 1.9 | 1.3 | 0.68 |
| 2.5 | 1.3 | 0.52 |
| 2.2 | 1.2 | 0.55 |
| 2.9 | 1.7 | 0.59 |
| 2.2 | 1.4 | 0.64 |
| 1.9 | 1.1 | 0.58 |
| 1.3 | 0.9 | 0.69 |
| 1.8 | 1.2 | 0.67 |
| 1.2 | 0.7 | 0.58 |
| 1.7 | 1.1 | 0.65 |
| 1.8 | 1 | 0.56 |
| 1.7 | 0.9 | 0.53 |
| 1.2 | 0.8 | 0.67 |
| 1.3 | 1 | 0.77 |
| 2 | 1 | 0.5 |
| 1.5 | 0.9 | 0.6 |
| 1.2 | 0.7 | 0.58 |

Referring to Table 1, in the oriented electrical steel sheet according to the exemplary embodiment of the present invention, it can be seen that the grains of which the ratio (D2/D1) of a diameter (D1) of a circumscribed circle of each grain to a diameter (D2) of an inscribed circle of each grain is greater than 0.5 is 95% or more of total grains.

This is because, in the texture of the oriented electrical steel sheet according to the embodiment of the present invention, since the Goss grains of the surface grow into the steel sheet, grains with a round shape are generated.

Figure 2A:
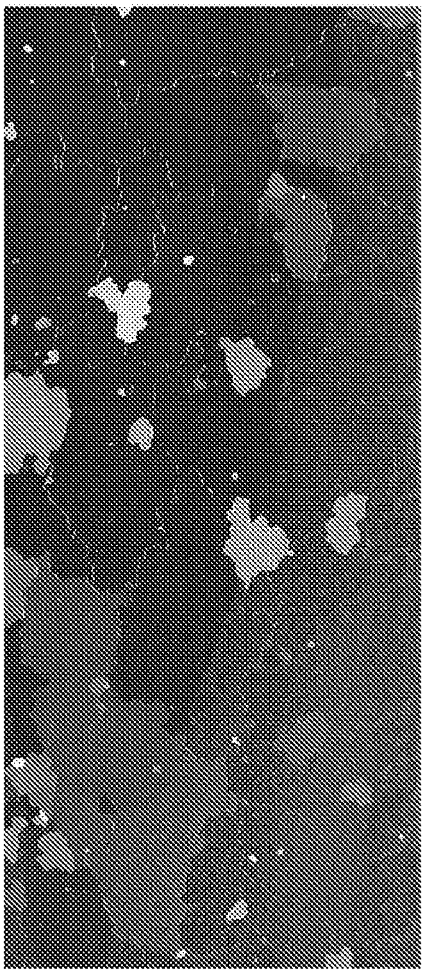
FIG. 2A is an optical microscope photograph showing grain distribution of a conventional oriented electric steel sheet.
Figure 2B:
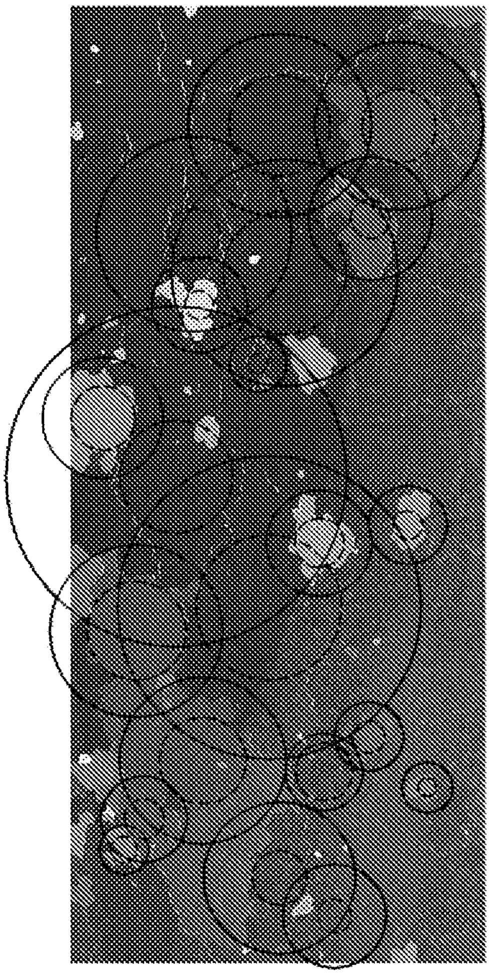
FIG. 2B is a photograph indicating a circumscribed circle and an inscribed circle on each grain of the oriented electrical steel sheet shown in FIG. 2A.

FIG. 2A show a texture of a conventional oriented electric steel sheet. FIG. 2B is a photograph indicating a circumscribed circle and an inscribed circle on each grain of the oriented electrical steel sheet shown in FIG. 2A.

It can be seen that an oriented grain electrical steel sheet produced by a prior art includes grains with an oval shape that are longer than that of the oriented grain steel sheet produced by the embodiment of the present invention.

Table 2 shows the ratio (D2/D1) of the relative sizes of the inscribed circles and the circumscribed circles of the grains of the oriented electrical steel sheet shown in FIG. 2B.

TABLE 2

| Circumscribed circle D1 | Inscribed circle D2 | Ratio (D2/D1) |
|---|---|---|
| 1.6 | 0.8 | 0.5 |
| 2.2 | 1.2 | 0.55 |
| 2.6 | 0.9 | 0.35 |
| 3.3 | 1.6 | 0.48 |
| 4.7 | 1.7 | 0.36 |
| 1.1 | 0.5 | 0.45 |
| 2.5 | 0.9 | 0.36 |
| 1 | 0.5 | 0.5 |
| 2.3 | 1.4 | 0.61 |
| 1.2 | 0.9 | 0.75 |
| 5.1 | 2.3 | 0.45 |
| 1.9 | 0.7 | 0.37 |
| 3.6 | 2.1 | 0.58 |
| 2.7 | 1.7 | 0.63 |
| 1.4 | 0.6 | 0.43 |

TABLE 2-continued

| Circumscribed circle D1 | Inscribed circle D2 | Ratio (D2/D1) |
|---|---|---|
| 0.8 | 0.4 | 0.5 |
| 1.3 | 0.5 | 0.38 |
| 0.7 | 0.3 | 0.43 |
| 1.8 | 1.1 | 0.61 |
| 1.1 | 0.5 | 0.45 |
| 0.9 | 0.35 | 0.39 |

The oriented electrical steel sheet produced by the prior art includes grains with a long oval shape, so that values of D2/D1 are smaller than those of the oriented electrical steel sheet according to the embodiment of the present invention.

In addition, grains of the oriented electrical steel sheet according to the exemplary embodiment of the present invention having a grain size of about 30 μm to about 1000 μm may be about 80% or more of the total grains.

Hereinafter, the present invention will be described in detail with reference to exemplary embodiments. However, the following exemplary embodiments are only examples of the present invention, and the present invention is not limited to the exemplary embodiments.

Exemplary Embodiment 1

A slab including Si at 2.0 wt %, C at 0.20 wt %, and the remaining portion including Fe and other inevitably impurities was heated at a temperature of 1150° C., then hot rolled, and then the hot rolled sheet was annealed at an annealing temperature of 900° C. and a dew point of 60° C. Then, the steel sheet was cooled, pickled, and then cold rolled at a reduction ratio of 65% to prepare a cold rolled sheet having a thickness of 0.8 mm.

The cold rolled sheet was again decarburized and annealed at a temperature of 900° C. in a wet mixed gas atmosphere of hydrogen and nitrogen (a dew point temperature of 60° C.) as shown in Table 3, and was again cold rolled at a reduction ratio of 65% to prepare a cold rolled sheet having a thickness of 0.28 mm.

Then, in the secondary annealing, the decarburization annealing was performed at a temperature of 950° C. for 2 minutes in a wet mixed gas atmosphere of hydrogen and nitrogen (a dew point temperature of 60° C.), and then heat treatment was performed for 3 minutes in a hydrogen atmosphere at 1100° C.

TABLE 3

| Decarburization time (s) | Grain Size (μm) | Goss fraction (%) | $B_{10}$ (T) | $W_{17/50}$ (W/Kg) | Classification |
|---|---|---|---|---|---|
| 10 | 35 | 14 | 1.55 | 3.21 | Comparative material |
| 25 | 65 | 20 | 1.59 | 2.92 | Comparative material |
| 50 | 102 | 41 | 1.68 | 2.11 | Comparative material |
| 80 | 150 | 72 | 1.81 | 1.59 | Inventive material |
| 90 | 165 | 75 | 1.84 | 1.47 | Inventive material |
| 90 | 150 | 78 | 1.85 | 1.45 | Inventive material |
| 100 | 195 | 81 | 1.87 | 1.33 | Inventive material |
| 200 | 390 | 32 | 1.62 | 2.58 | Comparative material |
| 100 | 201 | 80 | 1.86 | 1.38 | Inventive material |

As shown in Table 3, when the sizes of the grains of the surface of the sheet after the decarburization annealing process are in a range of 150 μm to 250 μm by securing the appropriate decarburization annealing time during the decarburization annealing process, it can be seen that a Goss fraction increases and magnetic flux density and iron loss are excellent.

Exemplary Embodiment 2

A slab including Si at 2.0 wt %, C at 0.20 wt %, and the remaining portion including Fe and other inevitably impurities was heated at a temperature of 1150° C., then hot rolled, and then the hot rolled sheet was annealed at an annealing temperature of 900° C. and a dew point of 60° C. for 150 seconds, cooled, and then pickled, and cold rolled at a reduction ratio of 45% to 75% as shown in Table 4. The cold rolled sheet was again decarburized and annealed at a temperature of 900° C. in a wet mixed gas atmosphere of hydrogen and nitrogen (a dew point temperature of 60° C.) for 150 seconds, and was again cold rolled at a reduction ratio of 45% to 75% as shown in Table 4 to prepare a cold rolled sheet having a thickness of 0.18 mm to 0.36 mm. Then, in the secondary annealing, the decarburization annealing was performed at a temperature of 950° C. for 2 minutes in a wet mixed gas atmosphere of hydrogen and nitrogen (a dew point temperature of 60° C.), and then heat treatment was performed for 3 minutes in a hydrogen atmosphere of 1100° C. The related contents are shown in Table 4.

TABLE 4

| Primary cold rolling | Secondary cold rolling | Final material | | | |
|---|---|---|---|---|---|
| Reduction ratio (%) | reduction ratio | Goss fraction | B10 | W17/50 | Classification |
| 45 | 75 | 67 | 1.72 | 1.75 | Comparative material |
| 50 | 70 | 74 | 1.8 | 1.49 | Inventive material |
| 60 | 65 | 82 | 1.87 | 1.33 | Inventive material |
| 60 | 60 | 81 | 1.88 | 1.3 | Inventive material |
| 70 | 70 | 72 | 1.84 | 1.39 | Inventive material |
| 75 | 65 | 58 | 1.71 | 1.77 | Comparative material |
| 75 | 60 | 61 | 1.7 | 1.81 | Comparative material |
| 75 | 55 | 60 | 1.7 | 1.8 | Comparative material |

As shown in Table 4, it can be seen that the reduction ratio during the primary and secondary cold rolling influences a Goss fraction and magnetization of a product sheet after the secondary annealing process.

From this result, it can be seen that a better magnetic flux density may be obtained when the reduction ratio during the cold rolling process is in a range of 50% to 70%.

Exemplary Embodiment 3

A slab including Si at 2.0 wt %, C at 0.20 wt %, and the remaining portion including Fe and other inevitably impurities was heated at a temperature of 1150° C., then hot rolled to a thickness of 3 mm, and then the hot rolled sheet was annealed at an annealing temperature of 900° C. and a dew point of 60° C. for 150 seconds, cooled, and then pickled, and cold rolled at a reduction ratio of 60%.

The cold rolled sheet was again decarburized and annealed at a temperature of 900° C. in a wet mixed gas atmosphere of hydrogen and nitrogen (a dew point temperature of 60° C.) for 150 seconds.

The cold rolling process was repeated two to four times.

The repeating of the cold rolling process twice means that the hot rolled sheet is first cold rolled, decarburized and annealed, and then second cold rolled. The repeating of the cold rolling process three times means that the hot rolled sheet is first cold rolled, decarburized, and annealed, and again second cold rolled, decarburized, and annealed, and then third cold rolled. The repeating of the cold rolling process four times means that the hot rolled sheet is first cold rolled, decarburized, and annealed, and again second cold rolled, decarburized, and annealed, and third cold rolled, decarburized, and annealed, and then fourth cold rolled.

Then, in the secondary annealing, the decarburization annealing was performed at a temperature of 950° C. in a wet mixed gas atmosphere of hydrogen and nitrogen (a dew point temperature of 60° C.), and then heat treatment was performed for 2 minutes in a hydrogen atmosphere at 1100° C. The related contents are shown in Table 5.

TABLE 5

| Number of cold rolling | Goss fraction | $B_{10}$ | $W_{17/50}$ |
|---|---|---|---|
| 2 | 80 | 1.87 | 1.33 |
| 3 | 88 | 1.92 | 1.28 |
| 4 | 92 | 1.95 | 1.17 |

As shown in Table 5, it can be seen that while maintaining the reduction ratio at 60%, as the number of the cold rolling increases, the Goss fraction increases and the magnetism improves.

While the exemplary embodiments of the present invention have been described hereinbefore with reference to the accompanying drawings, it will be understood by those skilled in the art that various changes in form and details may be made thereto without departing from the technical spirit and essential features of the present invention.

Therefore, the embodiments described above are only examples and should not be construed as being limitative in any respects. The scope of the present invention is determined not by the above description, but by the following claims, and all changes or modifications from the spirit, scope, and equivalents of claims should be construed as being included in the scope of the present invention.

The invention claimed is:

1. A method of manufacturing an oriented electrical steel sheet, comprising:

providing a slab including Si at 1.0 to 4.0 wt %, C at 0.1 to 0.4 wt %, and the remaining portion including Fe and other inevitably incorporated impurities;

heating the slab;

producing a hot rolled steel sheet by hot rolling the slab;

performing annealing of the hot rolled steel sheet;

primary cold rolling the annealed hot rolled steel sheet;

decarburizing and primary annealing the primary cold rolled steel sheet;

secondary cold rolling the decarburized and annealed steel sheet; and secondary annealing the secondary cold rolled steel sheet, wherein the secondary annealing includes a first step that is performed at an annealing temperature of about 850° C. to about 1000° C. and a dew point temperature of about 70° C. or less, and a second step that is performed at an annealing temperature of about 1000° C. to about 1200° C. and in an atmosphere of about 50 volume % of $H_2$, wherein the first step is performed for 300 seconds or less, and the second step is performed for about 60 to 300 seconds.

2. The method of manufacturing the oriented electrical steel sheet of claim 1, wherein a carbon amount of the electrical steel sheet after the secondary annealing step is about 0.002 wt % or less.

3. The method of manufacturing the oriented electrical steel sheet of claim 1, wherein a heating temperature of the slab is in a range of about 1100° C. to about 1350° C.

4. The method of manufacturing the oriented electrical steel sheet of claim 3, wherein the slab includes Mn at more than about 0 wt % and about 0.1 wt % or less, and S at more than about 0 wt % and about 0.005 wt % or less.

5. The method of manufacturing the oriented electrical steel sheet of claim 1, wherein the secondary annealing is continuously performed after the secondary cold rolling.

6. The method of manufacturing the oriented electrical steel sheet of claim 5, wherein the decarburizing and primary annealing of the primary cold rolled steel sheet and the secondary cold rolling of the decarburized and annealed steel sheet are repeated two or more times.

7. The method of manufacturing the oriented electrical steel sheet of claim 6, wherein a size of a grain of a surface of the decarburized and annealed steel sheet is in a range of about 150 μm to about 250 μm.

8. The method of manufacturing the oriented electrical steel sheet of claim 7, wherein the decarburizing and primary annealing is performed at an annealing temperature of about 850° C. to about 1000° C. and at a dew point temperature of about 50° C. to about 70° C.

9. The method of manufacturing the oriented electrical steel sheet of claim 7, wherein the decarburizing and primary annealing is performed in a region where a single phase of austenite or a composite phase of ferrite and austenite exists.

10. The method of manufacturing the oriented electrical steel sheet of claim 9, wherein when the decarburizing and primary annealing is performed, amount of carbon removed from the primary cold rolled steel sheet is in a range of about 0.0300 wt % to about 0.0600 wt %.

11. The method of manufacturing the oriented electrical steel sheet of claim 5, wherein when the primary cold rolling and the secondary cold rolling are performed, reduction ratios are in a range of about 50% to about 70% each.

* * * * *